US009652729B2

(12) United States Patent
Hoffman, Jr. et al.

(10) Patent No.: US 9,652,729 B2
(45) Date of Patent: May 16, 2017

(54) METROLOGY MANAGEMENT

(75) Inventors: William K. Hoffman, Jr., Pleasant Valley, NY (US); Timothy L. Holmes, Newburgh, NY (US); Jonathan Levy, Poughkeepsie, NY (US); Christopher E. Pepe, Montgomery, NY (US); Darryl D. Restaino, Modena, NY (US); Eric P. Solecky, Hyde Park, NY (US); Roger M. Young, Warwick, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 626 days.

(21) Appl. No.: 13/282,776

(22) Filed: Oct. 27, 2011

(65) Prior Publication Data
US 2013/0110448 A1    May 2, 2013

(51) Int. Cl.
  G06F 15/00    (2006.01)
  G06Q 10/06   (2012.01)
(52) U.S. Cl.
  CPC .............................. G06Q 10/06395 (2013.01)
(58) Field of Classification Search
  CPC ............................................... G06Q 10/06395
  USPC .......................................... 702/83, 84, 127
  See application file for complete search history.

(56) References Cited

U.S. PATENT DOCUMENTS

| 6,363,294 | B1 * | 3/2002 | Coronel et al. ............... 700/121 |
| 6,442,496 | B1 | 8/2002 | Pasadyn et al. |
| 6,708,129 | B1 * | 3/2004 | Pasadyn et al. ................ 702/81 |
| 6,965,808 | B1 * | 11/2005 | Conrad et al. ................ 700/108 |
| 6,988,045 | B2 * | 1/2006 | Purdy ............................. 702/83 |
| 7,460,968 | B1 | 12/2008 | Good et al. |
| 7,487,054 | B2 | 2/2009 | Ayala et al. |
| 7,606,677 | B1 * | 10/2009 | Janik et al. ................... 702/117 |
| 7,650,251 | B2 * | 1/2010 | Baseman et al. ............... 702/81 |
| 7,895,008 | B2 | 2/2011 | Behm et al. |
| 8,229,691 | B2 * | 7/2012 | Behm et al. .................... 702/81 |

(Continued)

OTHER PUBLICATIONS

A. Holfeld et al., "A Fab-Wide APC Sampling Application," IEEE Transactions on Semiconductor Manufacturing, vol. 20, No. 4, Nov. 2007, pp. 393-399.

(Continued)

*Primary Examiner* — John Breene
*Assistant Examiner* — Yaritza H Perez Bermudez
(74) *Attorney, Agent, or Firm* — Cantor Colburn LLP; Steven Meyers

(57) ABSTRACT

A method for managing a metrology system includes receiving a part, identifying, with a processing device, a part type associated with the part, retrieving, with the processing device, test rule logic associated with the part type from a database, retrieving, with the processing device, measurement data associated with the identified part type, processing, with the processing device, the measurement data, applying, with the processing device, the test rule logic to the processed measurement data to determine whether the part should be measured, outputting the part responsive to determining that the part should not be measured, and incrementing, with the processing device, a counter and saving a value of the counter in the database responsive to outputting the part responsive to determining that the part should not be measured.

17 Claims, 2 Drawing Sheets

(56) References Cited

U.S. PATENT DOCUMENTS

| | | | |
|---|---|---|---|
| 2004/0121495 A1 | 6/2004 | Sonderman et al. | |
| 2008/0124818 A1* | 5/2008 | Li et al. | 438/8 |
| 2008/0286885 A1* | 11/2008 | Izikson et al. | 438/7 |
| 2009/0306803 A1 | 12/2009 | Behm et al. | |
| 2010/0249974 A1 | 9/2010 | Fei et al. | |

OTHER PUBLICATIONS

An-Jhih Su et al., "On the Interaction Between Measurement Strategy and Control Performance in Semiconductor Manufacturing," Journal of Process Control 18 (2008), pp. 266-276.

R. Babikian et al., "Statistical Methods for Measurement Reduction in Semiconductor Manufacturing," 1998 IEEE, SEMI Advanced Semiconductor Manufacturing Conference, Sep. 23-25, 1998, pp. 212-215.

X.Q. Liu, "Analytical Analysis of Effect of Sampling Plan on Cpk," 1995 IEEE, Engineering Management Conference, Jun. 25-28, 1995, pp. 257-259.

\* cited by examiner

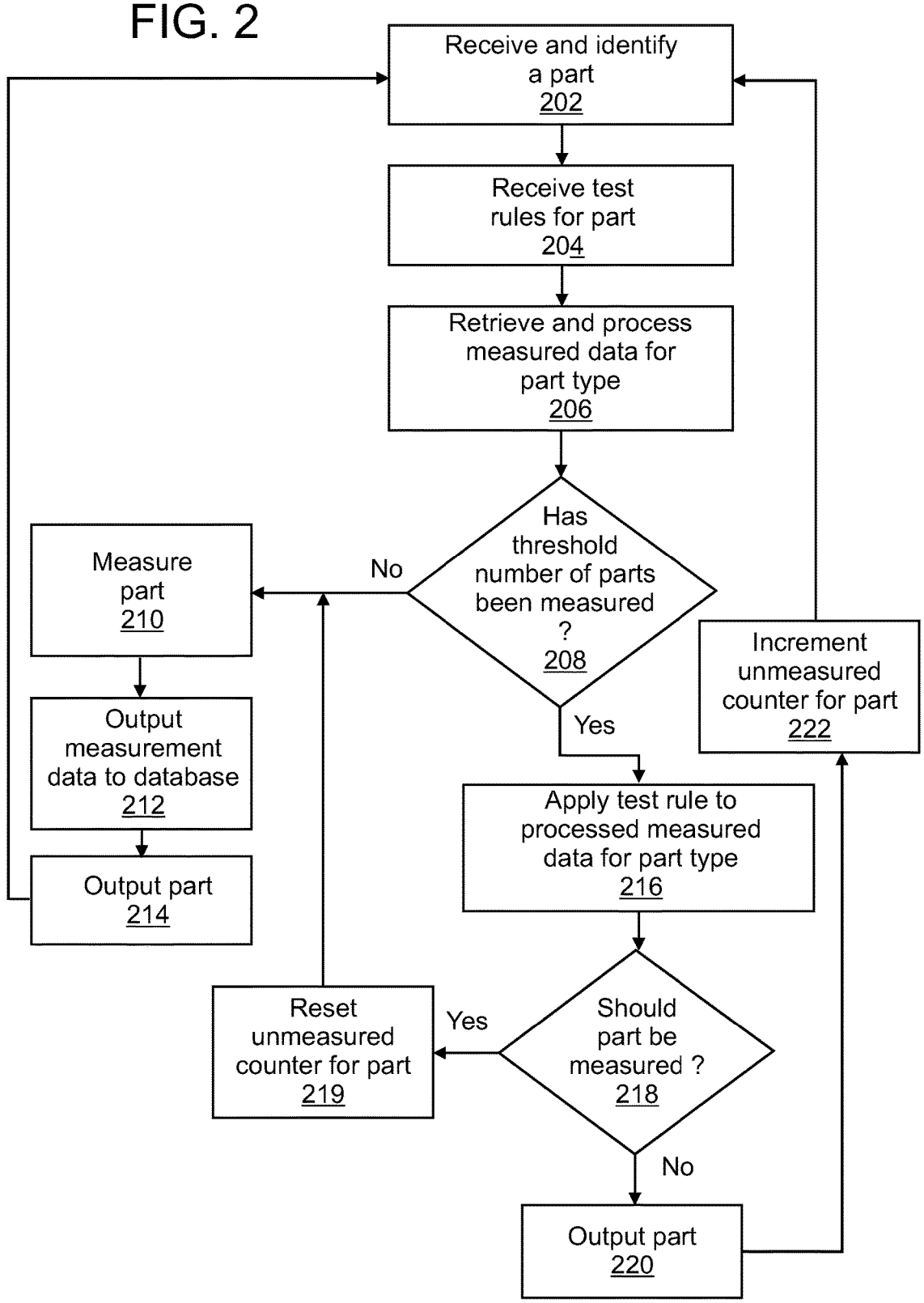

METROLOGY MANAGEMENT

BACKGROUND

The present invention relates to metrology management, and more specifically, to managing and organizing metrology systems and processes.

Metrology includes the measurement and testing of objects. In this regard, metrology schemes are used to measure parts and components in manufacturing processes. The measurements may be taken following various stages in the fabrication process to ensure the quality of the parts and components.

Metrology schemes are of particular use in the fabrication of semiconductor devices. In this regard, semiconductor devices may be fabricated on silicon wafers. The semiconductor devices are fabricated using a sequence of fabrication steps that include, for example, the deposition of materials, the removal of materials, and other fabrication processes. Metrology schemes are often used to measure features formed on the wafers to ensure that the features meet desired specifications. Various metrology methods may be used following any number of steps in a fabrication sequence to ensure that the silicon devices are formed within desired specifications.

BRIEF SUMMARY

According to one embodiment of the present invention a method for managing a metrology system includes receiving a part, identifying, with a processing device, a part type associated with the part, retrieving, with the processing device, test rule logic associated with the part type from a database, retrieving, with the processing device, measurement data associated with the identified part type, processing, with the processing device, the measurement data, applying, with the processing device, the test rule logic to the processed measurement data to determine whether the part should be measured, outputting the part responsive to determining that the part should not be measured, and incrementing, with the processing device, a counter and saving a value of the counter in the database responsive to outputting the part responsive to determining that the part should not be measured.

According to another embodiment of the present invention a metrology system includes a metrology tool operative to perform a measurement and output data, a processor communicatively connected to the metrology tool, the processor operative to identify a part type associated with a part received by the metrology tool, retrieve test rule logic associated with the part type from a database, retrieve measurement data associated with the identified part type, process the measurement data, apply the test rule logic to the processed measurement data to determine whether the part should be measured, send an instruction to the metrology tool to output the part responsive to determining that the part should not be measured, and increment a counter and saving a value of the counter in the database responsive to outputting the part responsive to determining that the part should not be measured.

According to yet another embodiment of the present invention a non-transitory computer-readable storage medium including computer executable instructions that, when executed on a processor of a computer apparatus, direct the processor to perform a method for managing a metrology system, the method includes receiving a part, identifying a part type associated with the part, retrieving test rule logic associated with the part type from a database, retrieving measurement data associated with the identified part type, processing the measurement data, applying the test rule logic to the processed measurement data to determine whether the part should be measured, outputting the part responsive to determining that the part should not be measured, and incrementing a counter and saving a value of the counter in the database responsive to outputting the part responsive to determining that the part should not be measured.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 is a flow diagram illustrating a method of managing a metrology system, in accordance with an exemplary embodiment.

DETAILED DESCRIPTION

Figure 1:
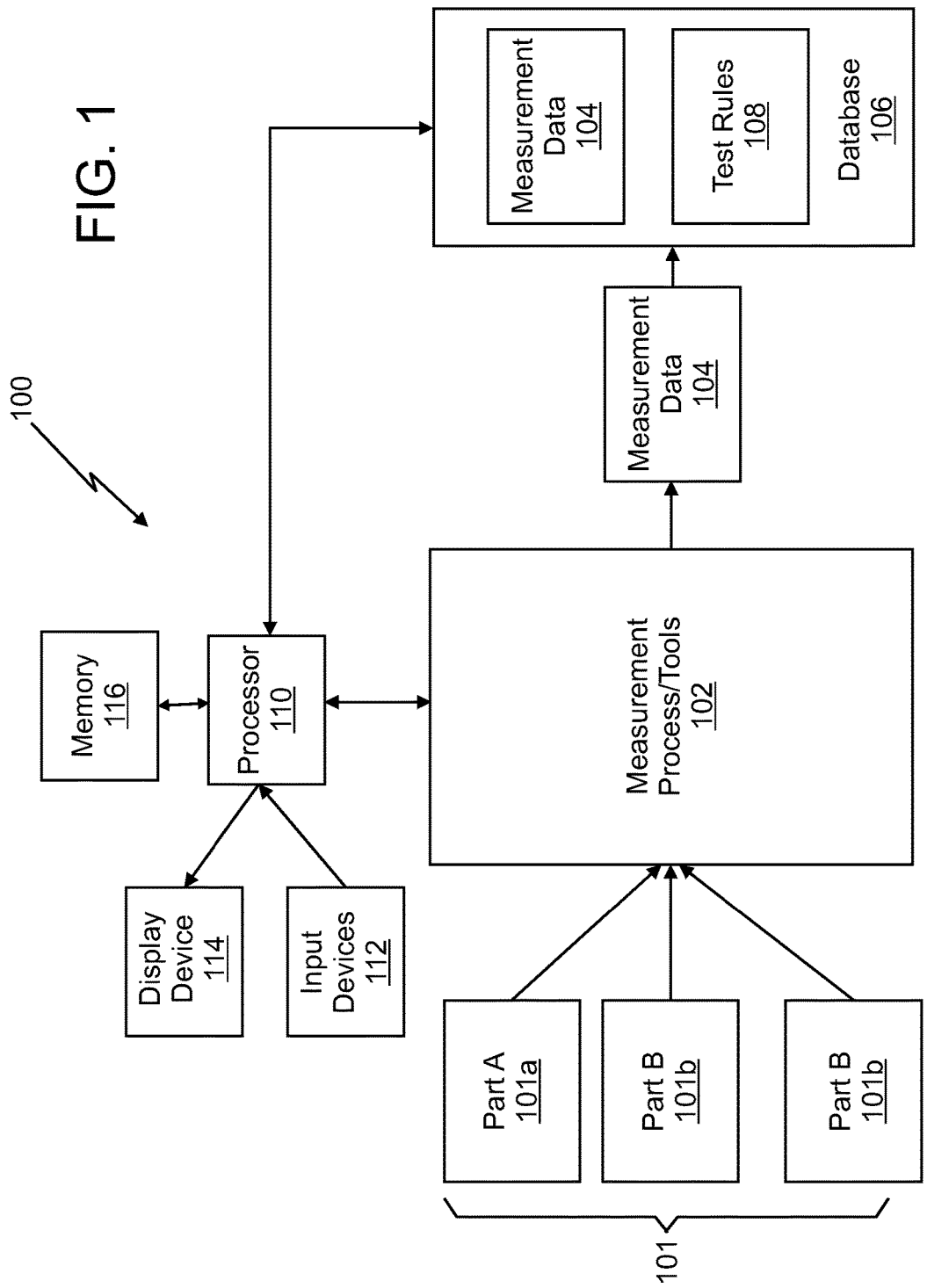
FIG. 1 is a block diagram of an exemplary metrology system.

FIG. 1 illustrates a block diagram of an exemplary metrology system 100. The system 100 includes measurement tools or processes 102 that receive parts 101 (101a-c) and may perform a measurement process such as, for example, taking an image of a portion of a part 101 and measuring features of the part 101 that are represented by the image. In the illustrated example, the parts 101 are semiconductor wafers that may include features of semiconductor devices that have been fabricated, or are in the process of being fabricated. However, the parts 101 may include any type of part or component for any type of device, or a complete device. The measurement tools or processes 102 receive a part 101, perform a measurement task, and output measurement data 104 to a database 106 that may include, for example, one or more memory devices operative to organize, store, and output stored data. The database 106 may also include test rules 108 that may include any number of rules that may be associated with testing the parts 101. The database 106 and the measurement process or tools 102 are communicatively linked to a processor 110 that is communicatively linked to input devices 112, a display device 114, and a memory 116.

In the illustrated embodiment, the parts 101 include a part A 101a and a part B 101b, but may include any combination of parts. The part A 101a and the part B 101b are similar parts, and each include an identifier that may be present on the part 101 or on a fixture that retains the part 101. Thus, when a part 101 enters the measurement process or tool 102, the part 101 may be identified, either uniquely such as, with a part serial number, or by a part type or lot number that identifies the type of part 101. Alternatively, an alternate method may be used to identify a part such as, for example, a visual sensor, an imaging system, or other sensor device that may be used to identify a part 101. The measurement process 102 may be used following any fabrication process used to fabricate the parts 101. The measurement process 102 may be used to determine whether a particular part is within a particular specification. The use of a measurement process 102 during the fabrication of a part 101 may be costly or inefficient. Thus, it is desirable to identify a part 101 when the part 101 enters the measurement process 102 and determine whether the part 101 should be tested or not tested. The determination may be based on a number of criteria including, for example, a number of parts that have been previously tested, the results of the tests, and measurement thresholds associated with a particular part type. By optimizing the number of parts tested based on the above criteria, costs of the measurement process 102 may be reduced while maintaining the quality of the parts 101.

FIG. 2 illustrates a block diagram of an exemplary method that may be performed by the system 100 (of FIG. 1). In block 202, the system 100 receives a part 101 and identifies the part 101. In block 204, the processor 110 retrieves test rules 108 from the database 106 that is associated with the identified part 101. If a part cannot be identified, or if a test rule is not available, a default test rule may be retrieved or the part may be output with an indication that the part was not identified. In block 206, the previous measurement data 104 is retrieved from the database 106 and processed. The test rules 108 for the identified part may include a threshold number of parts that should be measured. In this regard, if a threshold number of parts have not been measured (as determined by, for example, counting the number of data entries for the part in the measurement data 104), the part will be measured in block 210. In block 212, the measurement data from the measurement is output to the database 106. The part is output in block 214. If the threshold number of parts has not been measured (in block 208), a test rule (test rule logic) may be applied to the processed measured data for the identified part 101 (i.e., part type). In this regard, the test rule is associated with the identified part 101 may be used to determine whether a part should be measured in block 218.

Test rules may be different for different types of identified parts. The test rules may be applied to different types of measurement data or processed measurement data. For example, the measured data may be processed to calculate a process capability index such as Cpk from the received measured data. A test rule function may be applied to the Cpk to determine whether the part 101 should be measured. For example, the test rule may include a variety of Cpk values that may be compared or matched with the calculated Cpk. Thus, if the calculated Cpk falls under, above, or between a particular Cpk value(s) the part may be measured or not measured. Whether the part is measured may also be determined based on a number of parts that have been measured. For example, the test rule for an identified part type may include a function that includes measuring every tenth part (i.e., where for ten parts received, nine parts are skipped or unmeasured and the tenth is measured) while the Cpk is between 1.5 and 1.8; a function that includes measuring every fifth part when the Cpk is greater than 1.0 and less than or equal to 1.5; and a function that includes measuring every part received when the Cpk is less than or equal to 1.0. Thus, the Cpk may be matched with a test rule function based on the Cpk. As more measurement data is received, the processed measurement data (e.g., a Cpk value) may change, thus the number of parts measured or skipped may change based on the measurement data. Though the example described above includes a Cpk value, the measured data may and associated test rules may be processed to calculate and accommodate other values such as, for example, module yield or fabrication defectively ranking. Any number or combinations of test rules or types of test rule functions may be applied to the measured data to determine whether to measure a received part.

If the part should be measured, an unmeasured part counter is reset in block 219, and the part is measured in block 210. If the part should not be measured (e.g., based on the measurement data, the test rule, and the number of parts not measured), the part is output in block 220, and an unmeasured part counter associated with the identified part or part type is incremented and saved in block 222. The system 100 may then receive another part in block 202.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method fabricating a semiconductor device utilizing a metrology system, the method comprising:
    receiving, at a metrology tool in the metrology system, a part, wherein the part is a fabricated part in a fabrication process for semiconductor devices;
    identifying, with a visual sensor in communication with the metrology tool, a part type associated with the part;
    retrieving, with the processing device, test rule logic associated with the part type from a database, wherein the test rule logic includes a threshold value of parts that should be measured;
    retrieving, with the processing device, previous measurement data associated with the identified part type that includes a number of parts measured;
    determining, with the processing device, if the number of parts measured is equal to or exceeds the threshold value of parts that should be measured;
    processing, with the processing device, the previous measurement data, including calculating a process capability index ($C_{pk}$) with the previous measurement data in response to the number of parts measured being equal to or exceeding the threshold value of parts;
    applying, with the processing device, the test rule logic to the processed previous measurement data including the $C_{pk}$ to determine whether the part should be measured;
    outputting, from the metrology tool, the part in response to determining that the part should not be measured; and incrementing, with the processing device, a counter and saving a value of the counter in the database responsive to outputting the part responsive to determining that the part should not be measured and iteratively returning to the receiving operation to receive another part at the metrology tool when another part is provided, wherein the $C_{pk}$ changes as additional measurement data is retrieved, and wherein applying the test rule logic further comprises for the identified part type:

providing a first $C_{pk}$ threshold value (x), a second $C_{pk}$ threshold value (y), and a third $C_{pk}$ threshold value (z);

measuring every $n^{th}$ part in response to determining that the part should be measured when $x<C_{pk}<y$;

measuring every $m^{th}$ part in response to determining that the part should be measured when $z<C_{pk}<x$; and measuring every part in response to determining that the part should be measured when $C_{pk}<z$;

wherein $z<x<y$, $1<m<n$, and m and n are integers and $C_{pk}<y$.

2. The method of claim 1, further comprising:

measuring the part responsive to determining that the part should be measured;

outputting measured data to the database; and outputting, from the metrology tool, the part.

3. The method of claim 1, wherein determining if the number of parts measured is equal to or exceeds the threshold value of parts that should be measured comprises:

counting a number of parts of an identified part type that have been measured responsive to retrieving the previous measurement data associated with the identified part type;

comparing the number of parts of the identified part type that have been measured to a threshold value;

measuring the part responsive to determining that the number of parts of the identified part type that have been measured is below the threshold value;

outputting measured data to the database; and outputting the part.

4. The method of claim 1, wherein the applying the test rule logic to the processed previous measurement data to determine whether the part should be measured comprises:

matching the processed previous measurement data to a function of the test rule, the function of the test rule including a threshold unmeasured part value;

counting a number of parts of an identified part type that have not been previously measured; and measuring the part responsive to determining that the number of parts of the identified part type that have not been previously measured is equal to a threshold value.

5. The method of claim 4, further comprising resetting the counter responsive to measuring the part.

6. The method of claim 1, wherein x=1.5, y=1.8, z=1.0, n=10 and m=5.

7. A metrology system comprising:

a metrology tool operative to perform a measurement and output data;

a processor communicatively connected to the metrology tool, the processor operative to:

identify a part type, via a visual sensor, associated with a part received by the metrology tool, wherein the part is a fabricated part in a fabrication process for semiconductor devices, retrieve test rule logic associated with the part type from a database, wherein the test rule logic includes a threshold value of parts that should be measured, retrieve previous measurement data associated with the identified part type that includes a number of parts measured, determine if the number of parts measured is equal to or exceeds the threshold value of parts that should be measured, process the previous measurement data, including calculating a process capability index ($C_{pk}$) with the previous measurement data in response to the number of parts measured being equal to or exceeding the threshold value of parts, apply the test rule logic to the processed previous measurement data including the $C_{pk}$ to determine whether the part should be measured, send an instruction to the metrology tool to output the part in response to determining that the part should not be measured, and increment a counter and saving a value of the counter in the database responsive to outputting the part responsive to determining that the part should not be measured and iteratively returning to the receiving operation to receive another part at the metrology tool when another part is provided, wherein the $C_{pk}$ changes as additional measurement data is retrieved, and wherein applying the test rule logic further comprises for the identified part type:

providing a first $C_{pk}$ threshold value (x), a second $C_{pk}$ threshold value (y), and a third $C_{pk}$ threshold value (z);

measuring every $n^{th}$ part in response to determining that the part should be measured when $x<C_{pk}<y$;

measuring every $m^{th}$ part in response to determining that the part should be measured when $z<C_{pk}<x$; and measuring every part in response to determining that the part should be measured when $C_{pk}<z$;

wherein $z<x<y$, $1<m<n$, and m and n are integers and $C_{pk}<y$.

8. The system of claim 7, wherein the system is further operative to measure the part responsive to determining that the part should be measured, output measured data to the database, and send an instruction to the metrology tool to output the part.

9. The system of claim 7, wherein the processor is further operative to:

count a number of parts of an identified part type that have been measured responsive to retrieving the previous measurement data associated with the identified part type, compare the number of parts of the identified part type that have been measured to a threshold value, send an instruction to the metrology tool to measure the part responsive to determining that the number of parts of the identified part type that have been measured is below the threshold value, output measured data to the database, and send an instruction to the metrology tool to output the part.

10. The system of claim 7, wherein the applying the test rule logic to the processed previous measurement data to determine whether the part should be measured comprises:

matching the processed previous measurement data to a function of the test rule, the function of the test rule including a threshold unmeasured part value;

counting a number of parts of an identified part type that have not been previously measured; and sending an instruction to the metrology tool to measure the part responsive to determining that the number of parts of the identified part type that have not been previously measured is equal to a threshold value.

11. The system of claim 10, wherein the processor is operative to reset the counter responsive to sending the instruction to the metrology tool to measure the part.

12. The system of claim 7, wherein x=1.5, y=1.8, z=1.0, n=10 and m=5.

13. A non-transitory computer-readable storage medium including computer executable instructions that, when executed on a processor of a computer apparatus, direct the processor to perform a method for managing a metrology system, the method comprising:
   receiving, at a metrology tool, a part, wherein the part is a fabricated part in a fabrication process for semiconductor devices;
   identifying, with a visual sensor in communication with the metrology tool, a part type associated with the part;
   retrieving test rule logic associated with the part type from a database, wherein the test rule logic includes a threshold value of parts that should be measured;
   retrieving previous measurement data associated with the identified part type that includes a number of parts measured;
   determining, with the processing device, if the number of parts measured is equal to or exceeds the threshold value of parts that should be measured;
   processing the previous measurement data, including calculating a process capability index ($C_{pk}$) with the previous measurement data in response to the number of parts measured being equal to or exceeding the threshold value of parts;
   applying the test rule logic to the processed previous measurement data including the $C_{pk}$ to determine whether the part should be measured;
   outputting, from the metrology tool, the part in response to determining that the part should not be measured; and
   incrementing a counter and saving a value of the counter in the database responsive to outputting the part responsive to determining that the part should not be measured and iteratively returning to the receiving operation to receive another part at the metrology tool when another part is provided;
   wherein the $C_{pk}$ changes as additional measurement data is retrieved, and
   wherein applying the test rule logic further comprises for the identified part type:
      providing a first $C_{pk}$ threshold value (x), a second $C_{pk}$ threshold value (y), and a third $C_{pk}$ threshold value (z);
      measuring every $n^{th}$ part in response to determining that the part should be measured when x<$C_{pk}$<y;
      measuring every $m^{th}$ part in response to determining that the part should be measured when z<$C_{pk}$<x; and
      measuring every part in response to determining that the part should be measured when $C_{pk}$<z;
      wherein z<x<y, 1<m<n, and m and n are integers and $C_{pk}$<y.

14. The non-transitory computer readable storage medium of claim 13, wherein the method further comprises:
   measuring the part responsive to determining that the part should be measured;
   outputting measured data to the database; and
   outputting, from the metrology tool, the part.

15. The non-transitory computer readable storage medium of claim 13, wherein determining if the number of parts measured is equal to or exceeds the threshold value of parts that should be measured comprises:
   counting a number of parts of an identified part type that have been measured responsive to retrieving the previous measurement data associated with the identified part type;
   comparing the number of parts of the identified part type that have been measured to a threshold value;
   measuring the part responsive to determining that the number of parts of the identified part type that have been measured is below the threshold value;
   outputting measured data to the database; and
   outputting the part.

16. The computer readable storage medium of claim 13, wherein the applying the test rule logic to the processed previous measurement data to determine whether the part should be measured comprises:
   matching the processed previous measurement data to a function of the test rule, the function of the test rule including a threshold unmeasured part value;
   counting a number of parts of an identified part type that have not been previously measured; and
   measuring the part responsive to determining that the number of parts of the identified part type that have not been previously measured is equal to a threshold value.

17. The non-transitory computer readable storage medium of claim 13, wherein x=1.5, y=1.8, z=1.0, n=10 and m=5.

* * * * *